United States Patent
Nam

(10) Patent No.: US 6,600,778 B1
(45) Date of Patent: Jul. 29, 2003

(54) METHOD AND APPARATUS FOR VSB SYMBOL SYNC RECOVERY

(75) Inventor: Ho Jun Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/131,397

(22) Filed: Aug. 7, 1998

(30) Foreign Application Priority Data

Nov. 3, 1997 (KR) .......................................... 1997/57681
Dec. 31, 1997 (KR) .......................................... 1997/80711

(51) Int. Cl.$^7$ .............................. H03H 7/30; H04L 7/04
(52) U.S. Cl. ...................... 375/232; 375/326; 375/350; 375/362
(58) Field of Search ................................. 375/362, 232, 375/356, 321, 326, 350, 354; 348/729, 731, 607, 725, 914

(56) References Cited

U.S. PATENT DOCUMENTS

| | | | | |
|---|---|---|---|---|
| 3,916,324 A | * | 10/1975 | Shuda | 327/165 |
| 4,007,329 A | * | 2/1977 | McClain et al. | 375/356 |
| 4,916,737 A | * | 4/1990 | Chomet et al. | 380/223 |
| 5,331,416 A | * | 7/1994 | Patel et al. | 348/614 |
| 5,592,235 A | * | 1/1997 | Park et al. | 348/555 |
| 5,642,382 A | * | 6/1997 | Juan | 348/725 |
| 5,648,987 A | * | 7/1997 | Yang et al. | 375/232 |
| 5,841,484 A | * | 11/1998 | Hulyalkar et al. | 348/607 |
| 5,877,816 A | * | 3/1999 | Kim | 348/526 |
| 5,959,682 A | * | 9/1999 | Kim et al. | 348/511 |
| 6,154,505 A | * | 11/2000 | Konishi et al. | 348/729 |

\* cited by examiner

*Primary Examiner*—Don N. Vo
(74) *Attorney, Agent, or Firm*—Birch, Stewart, Kolasch & Birch, LLP

(57) ABSTRACT

The HDTV receiver system includes a pre-detection processor to filter a digitized signal before detecting the sync signal. The pre-detection processor eliminates the effects of ghost signal which can cause distortion of the original sync signal. The pre-detection processor can be a tapped-delay-line filter, a blind mode equalizer, or both.

11 Claims, 8 Drawing Sheets

Fig.3(a)
Background Art
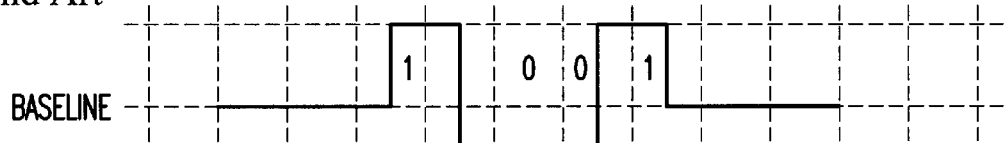
Fig.3(b)
Background Art
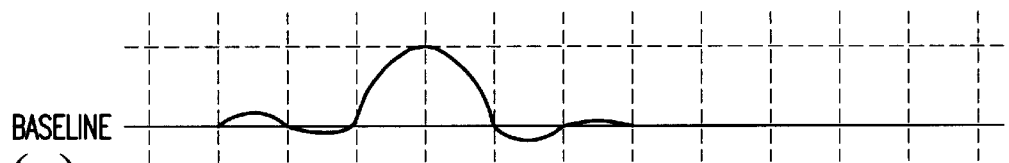
Fig.3(c)
Background Art
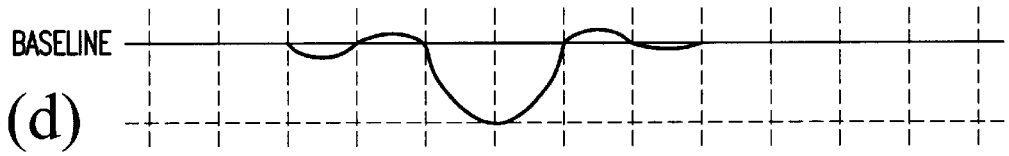
Fig.3(d)
Background Art
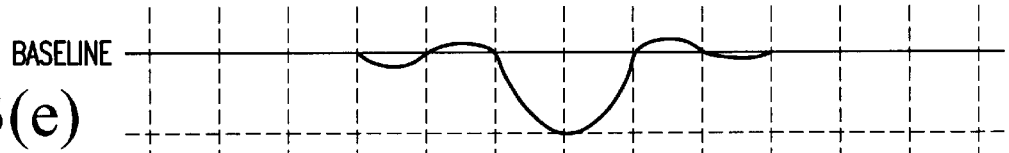
Fig.3(e)
Background Art
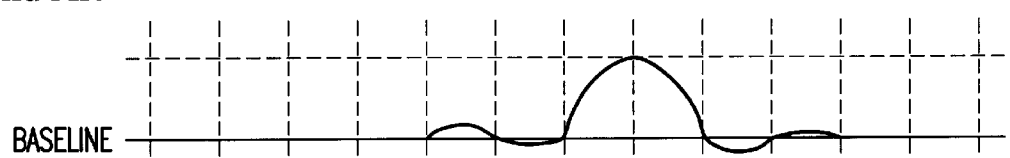
Fig.3(f)
Background Art
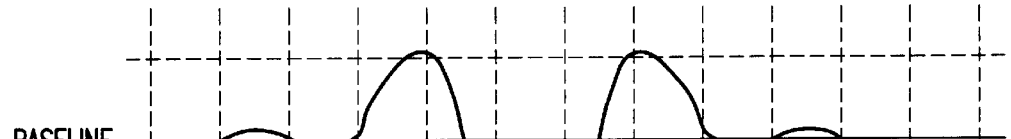
Fig.3(g)
Background Art
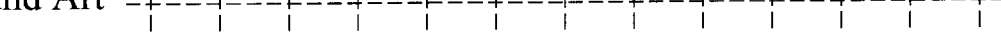

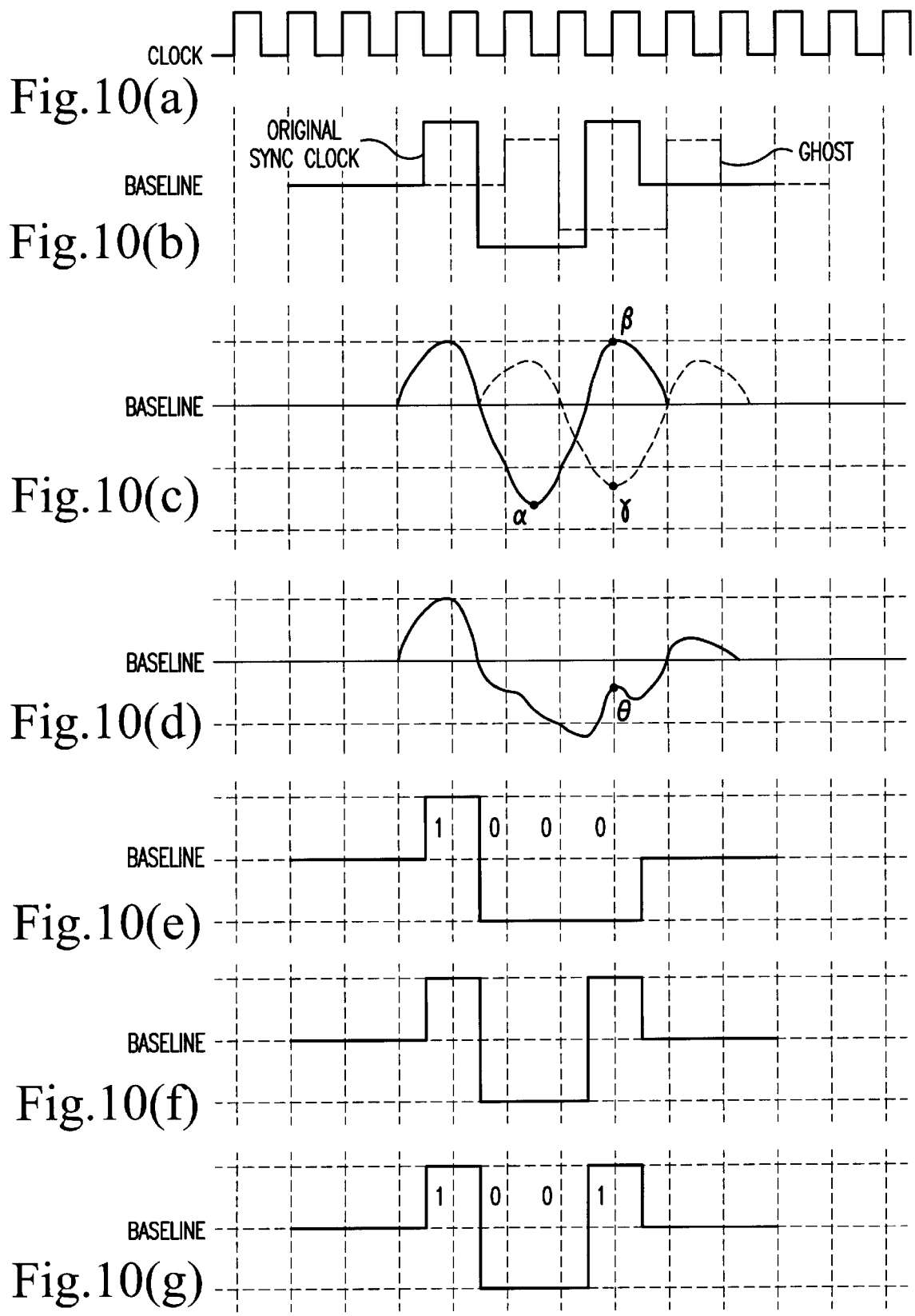

METHOD AND APPARATUS FOR VSB SYMBOL SYNC RECOVERY

BACKGROUND OF INVENTION

This invention relates to a signal recovery systems and more particularly to a recovery system for a vestigial sideband (VSB) digital signal.

Generally, the United States Grand Alliance (GA) utilizes the VSB transmission method as the broadcasting standard for a high definition television (HDTV). The standardized VSB transmission signal includes a specific synchronization (sync) signal pattern within the data stream which allows a HDTV receiver to easily recover the sync signal. The data stream incorporates consecutive data segments, wherein each segment consists of 832 symbol units and within the 832 symbol units, four symbols such as +1, 0, 0, +1 define a sync signal pattern while the other 828 symbols are data information. To recover the segment synchronization signal, the specific four symbol pattern must be found.

FIG. 1 shows a general block diagram of a HDTV receiver system including an analog signal processor 12 for receiving the transmission signal through the antenna 10, a low pass filter (LPF) 14 for low pass filtering the signal received from the analog signal processor 12, an analog/digital converter (ADC) 16 for converting the filtered analog signal to a digital signal, and a data Segment (DS) sync detector 18 for detecting and recovering the segment sync signal pattern from the digital signal received from the ADC 16. The recovered segment sync signal is output to the equalizer.

FIGS. 2, 3 and 4 show the effects of ghost signals in the 5 output waveforms of a HDTV receiver system described above in reference to FIG. 1. Particularly, FIG. 2 shows the output waveforms of a HDTV receiver system wherein the transmitted signal is undistorted by ghost signals. FIG. 2(a) shows the system clock, 2(b) shows the waveform of the low pass filtered signal output by LPF 14, and 2(c) shows the waveform of the digital sync signal after the analog signal was converted by the ADC 16. The DS sync detector 18 determines whether the digital signal is a sync pattern by comparing the digital signal pattern to a predetermined sync pattern.

FIG. 3(a) shows the system clock and 3(b) shows the waveform of a digital pattern which must be detected by the DS sync detector 18. FIGS. 3(c)–3(f) shows the low pass filtered waveform of each data segment sync symbols 1, 0, 0, 1 individually and 3(g) shows the combination of the waveforms shown in 3(a)–3(f). As shown in 3(g), the amplitude of sync symbol 0 is greater than the amplitude of sync symbol 1 in the low pass filtered waveform output by the LPF 14. The greater amplitude results from the addition of two consecutive 0 waveforms as shown in 3(d) and 3(e).

FIG. 4 shows the effects on the waveforms when ghost signal distorts the first 1.5 sync symbol portion. FIG. 4(a) shows the system clock, 4(b) shows the addition of ghost signal to the original data segment sync pattern, 4(c) shows the output waveform of the original and ghost signal as the signals pass through the LPF 14, and 4(d) shows the combination of the original sync waveform and the ghost waveform after the signals have passed through the LPF 14. Note in 4(c), the γ ghost signal portion corresponds to the α sync signal portion of the original sync pattern. Also, if the amplitude of γ portion is greater than β portion, the combination of the waveforms falls below the baseline as shown by θ in 4(d). Accordingly, if the baseline serves as the threshold for slicing the analog signal to a digital signal, the DS sync detector 18 cannot recognize θ portion as a '1'. Therefore, if the waveform shown in 4(d) is converted to a digital signal by it the ADC 16 according to the system clock, the DS sync detector 18 cannot detect the data segment sync pattern of 1, 0, 0, 1 because the original pattern was distorted by ghost signal.

OBJECTIVES OF THE INVENTION

An object of the present invention is to solve at least the problems and disadvantages of the related art.

Another object of the present invention is to provide a more efficient sync signal detector for a HDTV receiver.

A further object to the present invention is to eliminate the distortions caused by ghost signals.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the present HDTV receiver includes a pre-filtering processor before the signal is output to the sync detector to detect and recover the sync signal.

BRIEF DESCRIPTION OF THE DRAWING

The invention will be described in detail with reference to the following drawings in which like reference numerals refer to like elements wherein:

FIGS. 3(a)–(g) shows the system clock, the waveform of a predetermined digital pattern, the waveforms of the sync symbols 1, 0, 0, 1 individually and the combination of the waveforms of sync symbols;

FIG. 10 shows the resulting waveform outputs of the embodiment described in reference to FIG. 7.

DETAILED DESCRIPTION OF THE INVENTION

Figure 5:
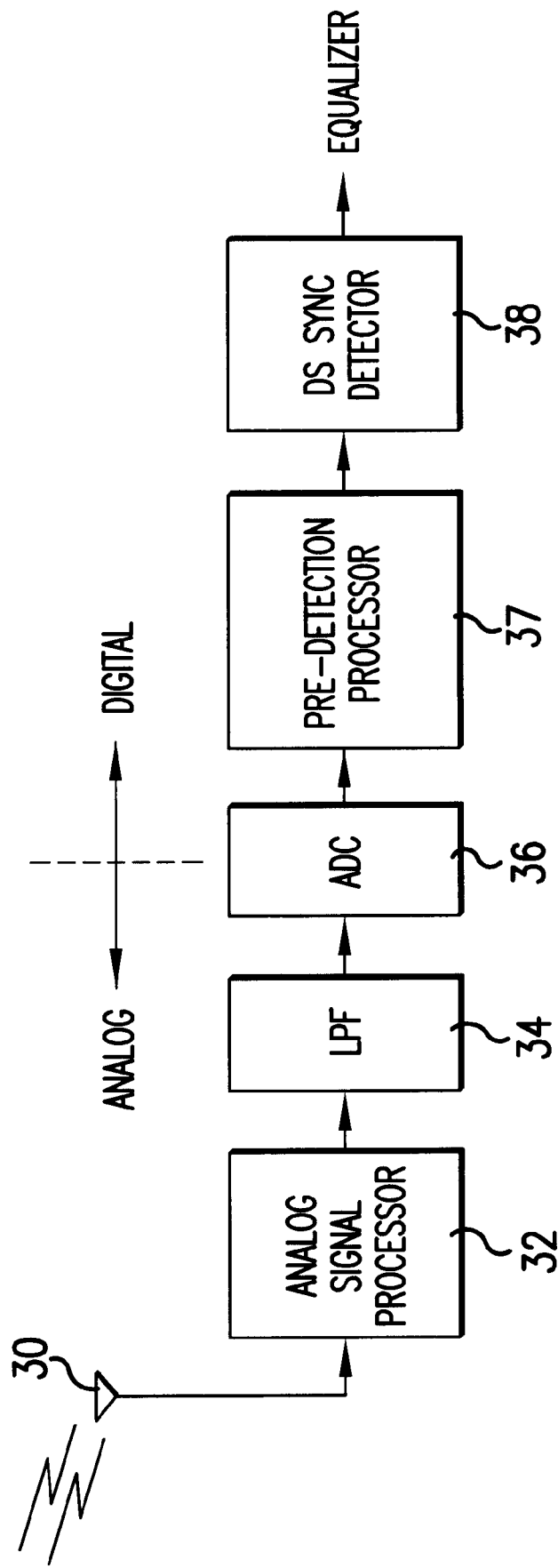
FIG. 5 shows the preferred embodiment of a HDTV receiver system.

FIG. 5 shows the preferred embodiment of a HDTV receiver system according to the present invention, including an analog signal processor 32 receiving the transmission signal through the antenna 30, a LPF 34 low pass filtering the signal received from the analog signal processor 32, an ADC 36 converting the filtered analog signal to a digital signal, a pre-detection processor 37 filtering the digital signal received from the ADC 36 to eliminate ghost signals, and a DS sync detector 18 detecting to recover the segment sync signal pattern from the digital signal received from the pre-detection processor 37 and outputting the recovered segment sync signal to the equalizer.

Figure 6:
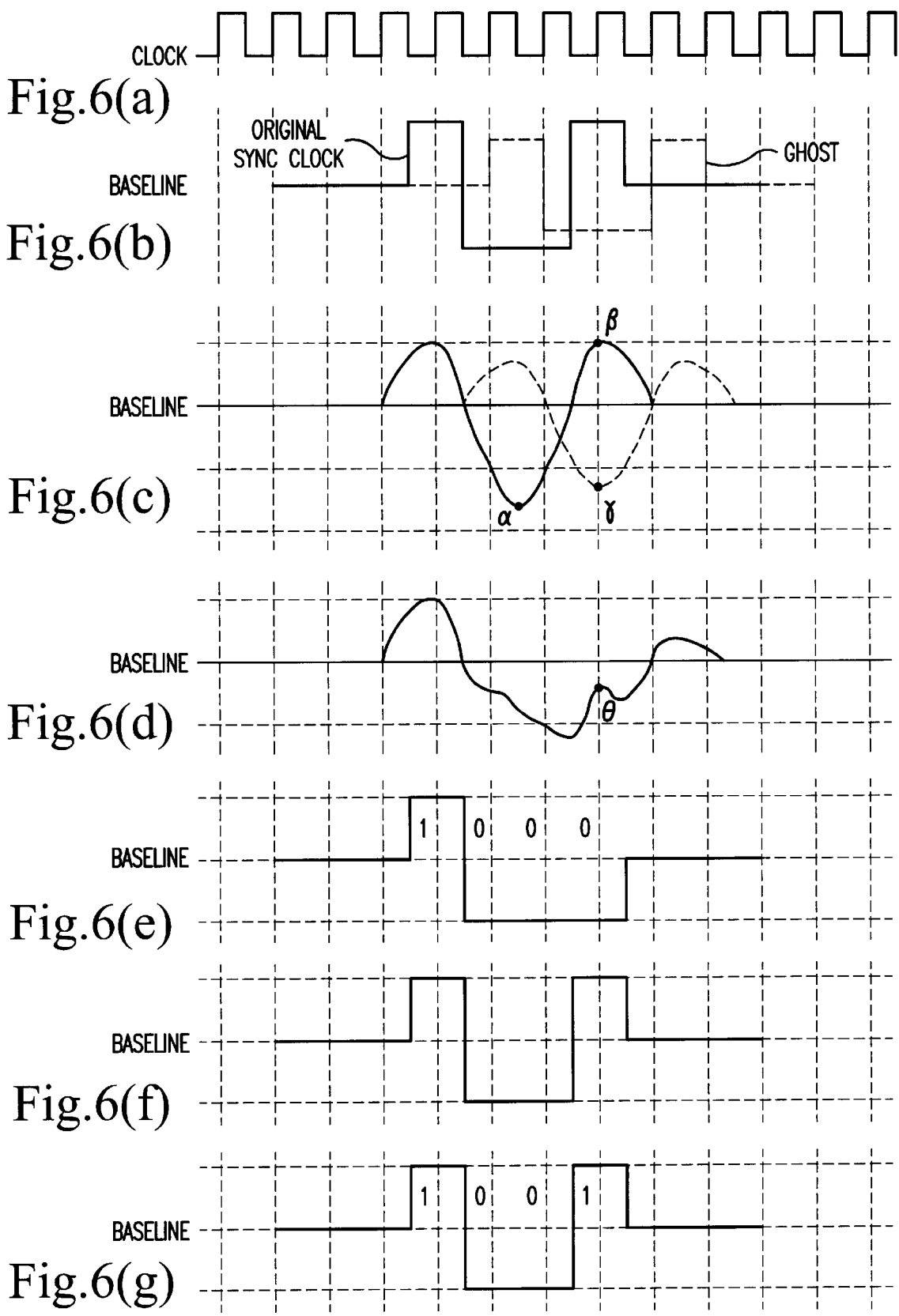
FIG. 6 shows the output waveforms of each block described in reference to FIG. 5.

FIG. 6 shows the output waveforms of each block described in 5 reference to FIG. 5. The analog signal processor 32, the LPF 34, the ADC 36, and the DS sync detector 38 function in the same manner as the corresponding blocks explained in reference to FIG. 1. The inventive concept of the present invention lies in the pre-detection processor 37 situated between the ADC 36 and the DS sync H detector 38. The pre-detection processor 37 filters the output signal of the ADC 36 using a short tapped-delay-line filter, if the data segment sync signal cannot be quickly detected due to ghost signals. Particularly, FIG. 6(a) shows the system clock, 6(b) shows the first 1.5 symbols of the original data segment sync signal affected by ghost signal, 6(c) shows the waveforms from 6(b) at the time the signals are low filtered by the LPF 34, and 6(d) shows the resulting waveform after the original and ghost signals are low filtered by the LPF 34.

When the amplitude of $\gamma$ portion is greater than $\beta$ portion as shown in 6(c), the combination of the waveforms falls below the baseline as shown by $\theta$ in 6(d). Once the waveform shown in 6(d) is converted to a digital signal by the ADC 36, a distorted pattern of 1, 0, 0, 0 is output rather than the original data segment sync pattern of 1, 0, 0, 1. In such situations, the ghost signals are eliminated by the pre-detection processor 37 and the recovery of the original data segment sync pattern waveform is shown in 6(f).

The tapped-delay-line filter (or a transversal filter) used by the pre-detection processor 37 eliminates ghost signals within 4~5 symbols, thus numerous taps are not necessary. Thus, the number of taps used for the tapped-delay-line filter may be lower than the number of taps used for the filter at the equalizer. However, the number of taps may be increased or decreased depending on the designer's needs.

The output waveform of the pre-detection processor 37 shown in 6(f) corresponds to the data segment sync pattern of 1, 0, 0, 1 as shown in 6(g). Accordingly, even if the original data segment sync pattern is distorted by ghost signals, the DS sync detector is able to accurately detect and recover the data segment sync pattern.

Figure 7:
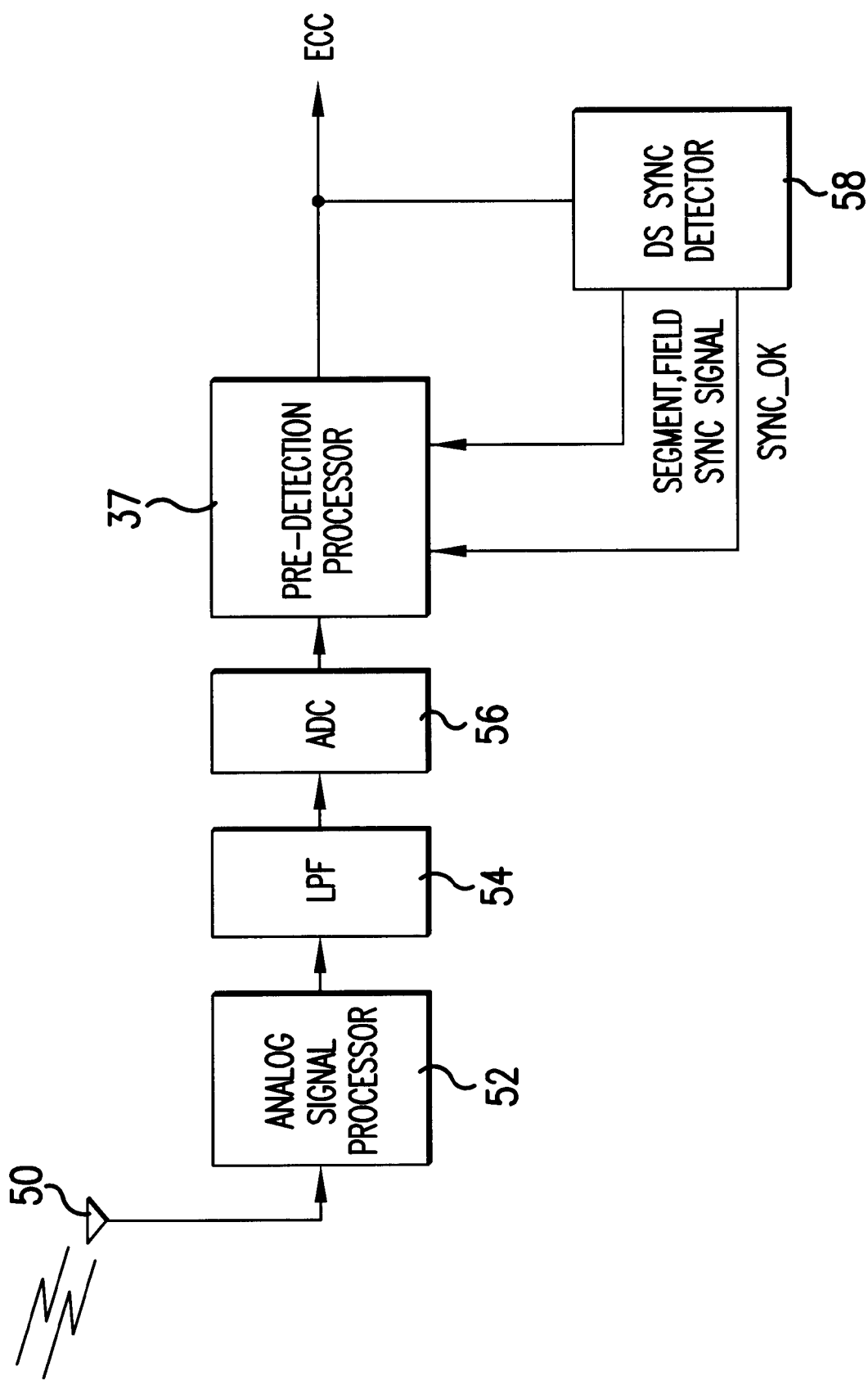
FIG. 7 shows an alternative embodiment of a HDTV receiver according to the present invention.

FIG. 7 shows an alternative embodiment of a HDTV receiver according to the present invention, including an analog signal processor 52 receiving the transmission signal through the antenna 50, a LPF 54 low pass filtering the signal received from the analog signal processor 52, an ADC 56 converting the filtered analog 20 signal to a digital signal, a pre-detection processor 57 receiving the output signal of the ADC 56 and eliminating ghost signal, and a sync detector 58 detecting to recover the data segment sync pattern, the field sync pattern and the VSB mode of the signal received from the pre-detection processor 57 and outputting the characteristics back to the pre-detection processor 57. The pre-detection processor 57 equalizes the signal in a blind mode to eliminate the ghost signal by filtering the signal until the sync detection signal (sync_OK) is received from the sync detector 58.

Figure 1:
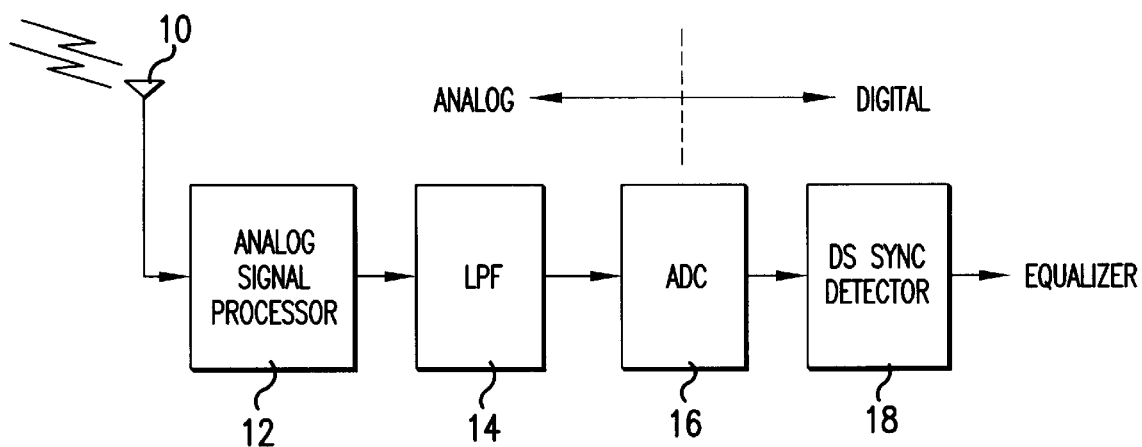
FIG. 1 is a simplified block diagram of a HTDV receiver.
Figure 2A:
FIGS. 2(a)–(c) shows the output waveforms of the blocks in FIG. 1 without ghost signal.
Figure 2B:
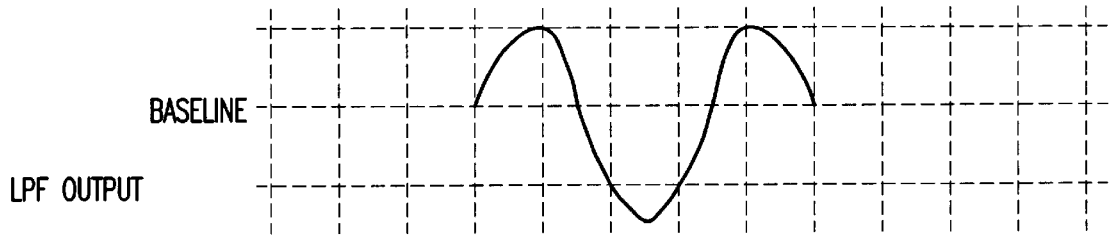
Figure 2C:
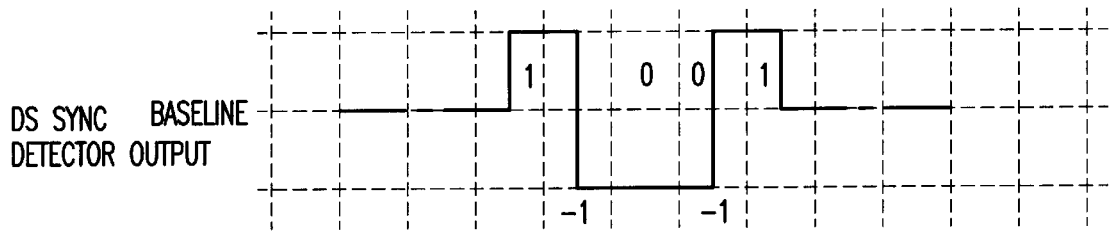
Figure 4A:
FIG. 4 shows the effects on the waveforms when ghost signal distorts the first 1.5 sync symbol portion.
Figure 4B:
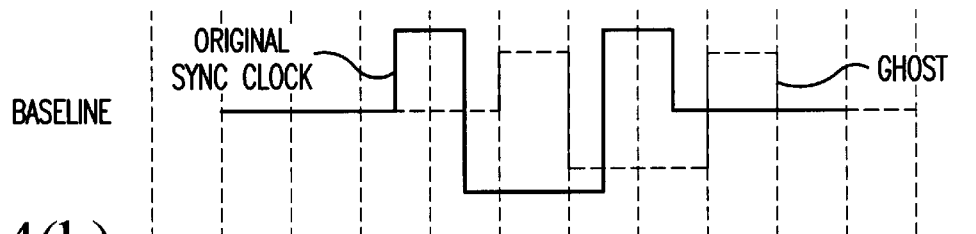
Figure 4C:
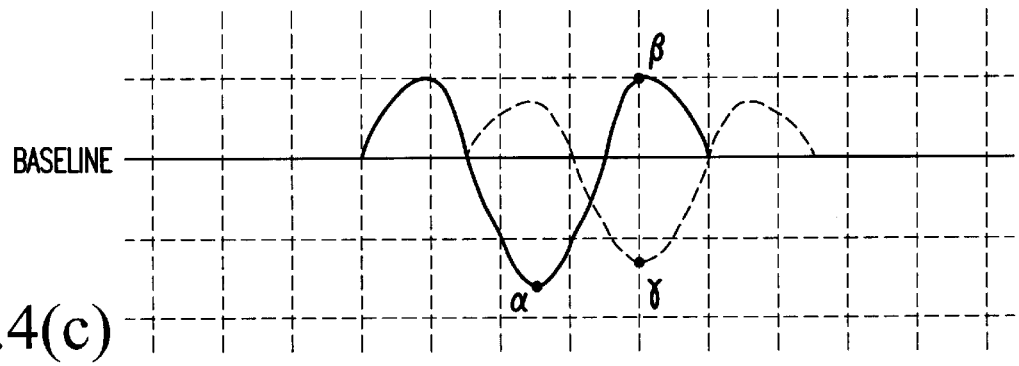
Figure 4D:
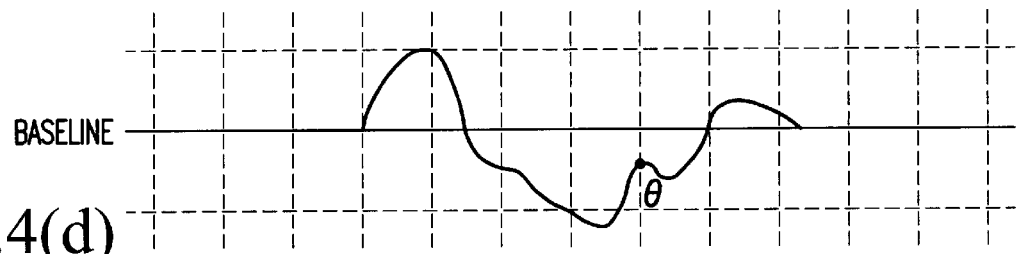
Figure 4E:
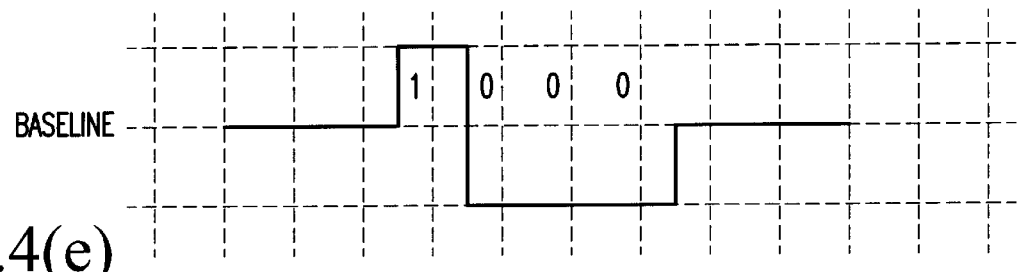

The analog signal processor 52, the LPF 54 and the ADC 56 functions in the same manner as the corresponding blocks explained with reference to FIG. 1. However, the present embodiment further includes a sync detector 58 receiving the equalized signal from the pre-detection processor 57 to detect the data segment sync signal, data field sync signal, VSB mode and other properties of the VSB signal. The HDTV system must be able to distinguish whether the segment sync signal for each data segment line and the field sync signal for each field data is a 8VSB broadcasting signal or a 16VSB cable signal.

Figure 8:
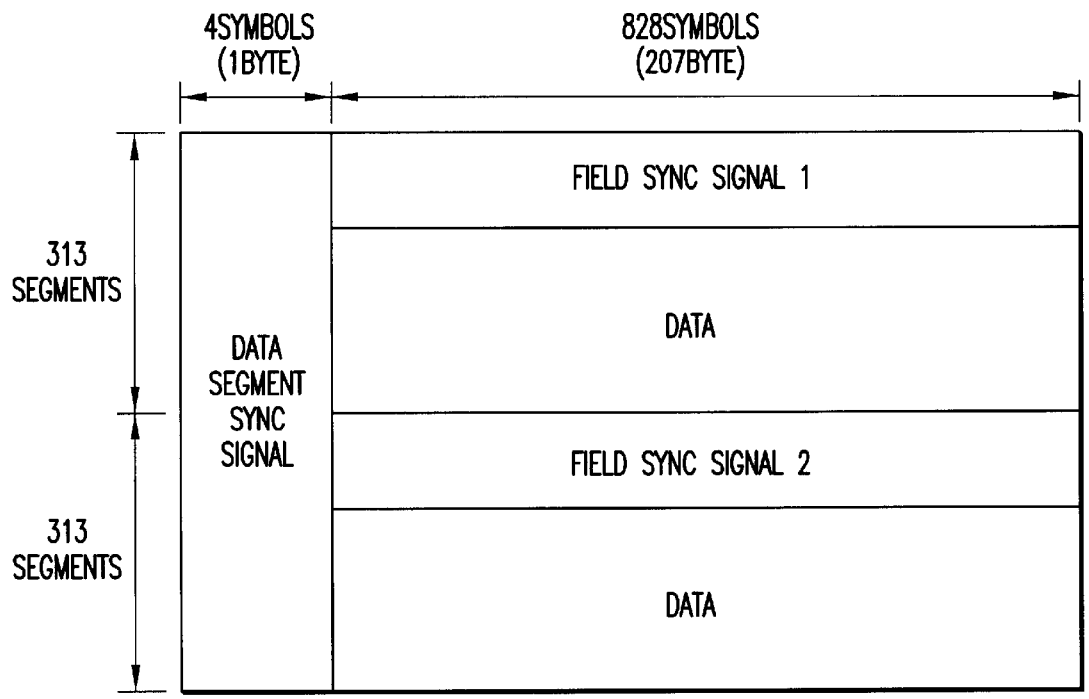
FIG. 8 shows a VSB signal structure.
Figure 9:
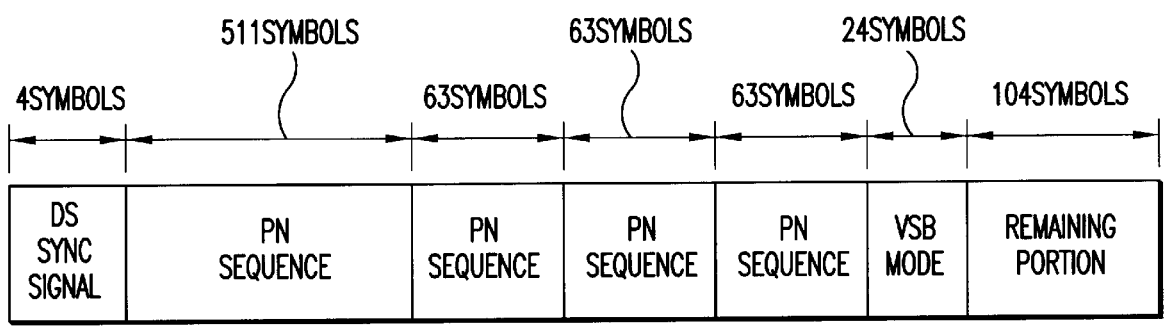
FIG. 9 shows a field sync signal structure.

Referring to FIG. 8, a VSB signal is directed to a multilevel signal having two frames, each frame having 313 segments. The first segment of each frame includes a two level frame sync signal and each segment consists of 832 multilevel symbols, wherein the first four symbols of each segment define a two level segment sync pattern. A small pilot signal is added to aid in carrier recovery in the receiver. Focusing on the field sync signal, the field sync signal includes the four symbols, the PN sequence, and the VSB mode, as shown in FIG. 9. The VSB mode has a fixed power level depending on whether it is a 8VSB signal or 16VSB signal. Detecting the segment sync pattern, the field sync pattern, the VSB mode, and other sync signal related information in a HDTV or digital system is essential. According to the present invention, the detection of the sync signal related information is performed after the pre-detection processor 57.

FIG. 10 shows the resulting waveform outputs of the embodiment described in reference to FIG. 7. FIG. 10(a) shows the system clock, 8(b) shows the first 1.5 symbols of the original segment sync signal distorted by ghost signal, 8(c) shows the waveforms from 8(b) at the time the signals are low filtered by the LPF 54, and 8(d) shows the resulting waveform after the original and ghost signals are low filtered by the LPF 54.

When the amplitude of $\gamma$ portion is greater than $\beta$ portion as shown in 8(c), the combination of the waveforms falls below the baseline as shown by $\theta$ in 8(d). Once the waveform shown in 8(d) is converted to a digital signal by the ADC 56, a distorted pattern of 1, 0, 0, 0 is output rather than the original data segment sync pattern of 1, 0, 0, 1. If the sync detector 58 simply compares the distorted signal to the predetermined sync symbol pattern of 1, 0, 0, 1, a data segment sync signal would not be detected even if the signal was a data segment sync signal.

Therefore, rather than directly detecting the sync symbol pattern from the output waveform shown in 10(e), the pre-detection processor 57 equalizes the signal to eliminate the ghost signal which results in the recovery of an output waveform shown in 10(f). The equalizing executed at this point must be done in a blind mode because the training sequence embedded in each field sync signal cannot be used since the sync signal has not been detected. Thus, by comparing the waveform recovered from a blind mode equalization as shown in 10(f) to the predetermined data segment sync signal pattern of 1, 0, 0, 1, the sync detector is able to accurately detect the data segment sync pattern even if the original data segment sync pattern is distorted by ghost signals.

When the sync detector 58 detects from the recovered signal the segment sync signal, the field sync signal, and the VSB mode, the sync detector 58 outputs a sync_OK signal indicating that all the sync signals has been detected. From the detected segment sync signal and field sync signal, the pre-detection processor 57 finds the location of the training sequence and terminates the blind mode equalizing to perform a normal equalization using the training sequence.

In sum, the HDTV receiver system and method according to the present invention is capable of detecting data segment sync signal affected by noise or ghost signals with high confidence by using a pre-detection processor for either filtering or equalizing the distorted signal before detecting the signal.

The foregoing embodiments are merely exemplary and are not to be construed as limiting the present invention. The teaching can be readily applied to other types of apparatuses. The description of the present invention is intended to be illustrative, and not to limit the scope of the claims. Many alternatives, modification, and variations will be apparent to those skilled in the art.

What is claimed is:

1. A signal recovery system comprising:
   a signal processor receiving the input signal, said signal processor converting the signal to a digital signal and outputting the digital signal;
   a first equalizer coupled to said signal processor to receive the digital signal, said first equalizer having a plurality of first filter taps and for filtering the digital signal and outputting the filtered digital signal;
   a signal detector coupled to said first equalizer, said signal detector receives the filtered digital signal to detect and recover the sync signal; and
   a second equalizer coupled to the signal detector to receive the recovered sync signal, the second equalizer for equalizing the digital signal and having a plurality of second filter taps,
   wherein a number of second filter taps is relatively greater than a number of first filter taps.

2. A signal recovery system of claim 1, wherein said signal processor comprises:
   an analog signal processor receiving the transmission signal and outputting the signal;
   a LPF coupled to said analog signal processor to receive the signal from said analog signal processor, said LPF low pass filtering the signal and outputting the filtered signal; and
   an ADC coupled to said LPF to receive the filtered signal; said ADC converting the filtered analog signal to a digital signal and outputting the digital signal.

3. A signal recovery system of claim 2, wherein said first equalizer is a tapped-delay-line filter.

4. A signal recovery system of claim 3, wherein said signal detector detects at least the segment sync signal.

5. A signal recovery system of claim 2, wherein said first equalizer is a blind mode equalizing filter.

6. A signal recovery system of claim 5, wherein said signal detector detects at least the segment sync signal, a field sync signal, and the VSB mode.

7. A signal recovery system of claim 6,
   wherein said signal detector outputs a control signal indicating a successful detection and recovery of the sync signals; and
   wherein said first equalizer receives the control:; signal and terminates the blind mode equalizing.

8. A signal recovery system comprising:
   a signal processor receiving the input signal, said signal processor converting the signal to a digital signal and outputting the digital signal;
   a tapped-delay-line filter coupled to said signal processor to receive the digital signal, said tapped-delay-line filter having a plurality of first filter taps and for filtering the digital signal and outputting the filtered digital signal;
   a signal detector coupled to said tapped-delay-line filter, said signal detector receives the filtered digital signal to detect and recover the sync signal; and
   an equalizer coupled to the signal detector to receive the recovered sync signal, the equalizer for equalizing the digital signal and having a plurality of second filter taps,
   wherein a number of second filter taps is relatively greater than a number of first filter taps.

9. A signal recovery system comprising:
   a signal processor receiving the input signal, said signal processor converting the signal to a digital signal and outputting the digital signal;
   a blind mode equalizing filter hating a plurality of first filter taps and coupled to said signal processor to receive the digital signal said blind mode equalizing filter filtering the digital signal and outputting the filtered digital signal;
   a signal detector coupled to said blind mode equalizing filter, said signal detector receives the filtered digital signal to detect and recover the sync signal; and
   an equalizer coupled to the signal detector to receive the recovered sync signal, the equalizer for equalizing the digital signal and having a plurality of second filter taps,
   wherein a number of second filler taps is relatively greater than a number of first filter taps.

10. A signal recovery system comprising:
    a signal processor receiving the input signal, said signal processor converting the signal to a digital signal and outputting the digital signal;
    a first equalizer coupled to said signal processor to receive the digital signal, said first equalizer including a plurality of first filter taps and filtering the digital signal to output a filtered digital signal; and
    a second equalizer coupled to said first equalizer to receive the filtered digital signal, said second equalizer including a plurality of second filter taps and post-filtering the filtered image in order to detect and recover the sync signal,
    wherein a number of second filter taps is relatively greater than a number of first filter taps.

11. A method for signal recovery comprising:
    receiving and converting the input signal a digital signal, and outputting the digital signal;
    pre-filtering the digital signal using a filter with a plurality of first taps and outputting the filtered digital signal;
    detecting and recovering the sync signal from the filtered digital signal; and
    equalizing the digital signal to recover the sync signal using a plurality of second filter taps; and
    wherein a number of second filter taps is relatively greater than a number of first filter taps.

* * * * *